United States Patent [19]
Cohen

[11] Patent Number: 4,777,855
[45] Date of Patent: Oct. 18, 1988

[54] METHOD OF FABRICATING PILLOW PRESENTING PORTIONS OF DIFFERENT FIRMNESS

[75] Inventor: Arnold Cohen, Los Angeles, Calif.

[73] Assignee: Convo Corporation, Gardena, Calif.

[21] Appl. No.: 135,566

[22] Filed: Dec. 21, 1987

Related U.S. Application Data

[63] Continuation of Ser. No. 927,969, Nov. 7, 1986, abandoned.

[51] Int. Cl.⁴ .................................................. B26D 3/00
[52] U.S. Cl. .................................. 83/862; 83/13; 83/870; 5/434
[58] Field of Search ................ 83/862, 870, 13; 5/434

[56] References Cited

U.S. PATENT DOCUMENTS

| | | | |
|---|---|---|---|
| D. 261,681 | 11/1981 | Chandler | 5/436 X |
| 2,880,428 | 4/1959 | Forsland | 5/436 |
| 2,898,975 | 8/1959 | Wagner | 5/481 X |
| 2,933,738 | 4/1960 | Whelan | 5/436 |
| 3,148,389 | 9/1964 | Lustig | 5/434 X |
| 3,242,511 | 3/1966 | Fultz et al. | 5/468 |
| 3,924,283 | 12/1975 | Shave | 5/434 |
| 3,987,507 | 10/1976 | Hall | 5/436 X |
| 4,118,813 | 10/1978 | Armstrong | 5/436 X |
| 4,233,700 | 11/1980 | Spann | 5/481 X |
| 4,259,757 | 4/1981 | Watson | 5/446 X |
| 4,320,543 | 3/1982 | Dixon | 5/434 |
| 4,501,034 | 2/1985 | Greenawalt | 5/434 X |
| 4,574,411 | 3/1986 | Yagi | 5/434 |

FOREIGN PATENT DOCUMENTS

| | | | |
|---|---|---|---|
| 37390 | 10/1981 | European Pat. Off. | 5/434 |
| 2305956 | 10/1976 | France | 5/434 |

OTHER PUBLICATIONS

Pro Tech Pacific, *The Pro Pillow*, 1981.

*Primary Examiner*—Frank T. Yost
*Attorney, Agent, or Firm*—Harlan P. Huebner

[57] ABSTRACT

A composite plastic foam pillow has a convoluted upper surface, a flat lower surface and a core disposed between those surfaces which is provided with a central void for imparting decreased firmness to the pillow adjacent the void. It is fabricated by coring a block of plastic foam, cutting out a central portion of the core, and then replacing the core and sealing it in its original position.

1 Claim, 2 Drawing Sheets

METHOD OF FABRICATING PILLOW PRESENTING PORTIONS OF DIFFERENT FIRMNESS

This is a continuation of copending application Ser. No. 927,969 filed Nov. 7, 1986, now abandoned.

BACKGROUND OF THE INVENTION

1. Field of the Invention

The present invention relates to pillow structures and more particularly to a composite plastic foam pillow presenting portions of different firmness.

2. Description of the Prior Art

The availability of commercially produced plastic foam materials and especially of such materials having convoluted upper surfaces has led to the development of a wide variety of therapeutic mattresses and pillows made of such material. Initially, pillows of resilient materials were configured to a user's head and neck as disclosed, for example, in the patents of Boos, U.S. Pat. No. 2,940,088, or De Laitre, et al. U.S. Pat. No. 3,829,917. With the advent of convoluted surfaced materials, layered composites similarly configured by shaping a base layer appeared, as disclosed, for example, in the patent of Dixon, U.S. Pat. No. 4,320,543. The contouring required in both of these types of pillows is necessarily time consuming and hence costly, and it is an object of the present invention to provide a pillow presenting portions of different firmness whereby the weight of the user's head will configure the pillow's surface to the user's head and neck.

SUMMARY OF THE INVENTION

The foregoing together with other objects of the invention is achieved by fabricating a pillow of plastic foam material to present an upper surface of convoluted configuration, a flat lower surface, and an intermediate layer of material having a void so located with respect to the portion of the upper surface on which the user's head normally rests as to provide decreased firmness in that portion. Since that portion ordinarily is approximately central of the pillow, the void is completely enclosed by the material of the pillow.

Fabrication of such a pillow conveniently is accomplished by removing a core of the pillow material, forming a void in it at the desired location and then replacing and adhesively sealing the core, or another similarly shaped piece of material, as hereinafter described in greater detail.

These and other objects and advantages will become apparent from the following part of the specification wherein details have been described for the competence of disclosure without intending to limit the scope of the invention which is setforth in the appended claims.

BRIEF DESCRIPTION OF THE DRAWINGS

These advantages may be more clearly understood from the following detailed description and by reference to the drawings in which.

DETAILED DESCRIPTION OF THE PREFERRED EMBODIMENT

Figure 1:
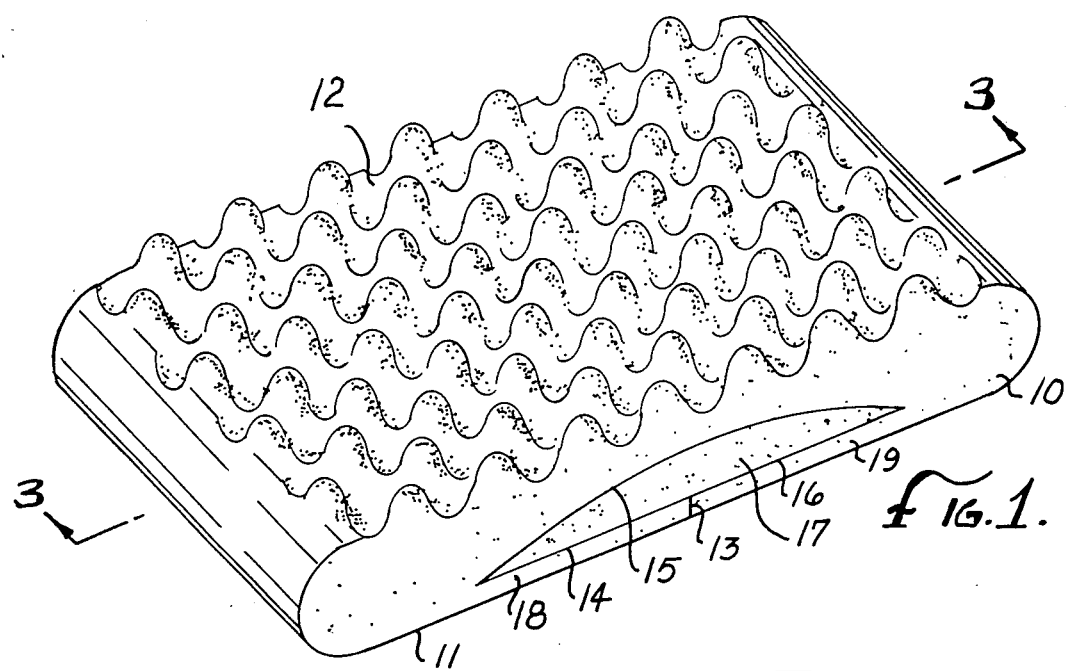
FIG. 1 is a view in perspective of a pillow embodying the present invention.

As shown in FIGS. 1, 3, 4, and 5, the preferred form of the pillow of the present invention comprises a block 10 of a cellular formed material such as polyurethane foam having a flat bottom surface 11 and a convoluted upper surface 12. Such material is commercially available in sheets.

In fabricating the pillow, an incision 13 is first made in the block 10 completely across its short dimension and to a depth of less than half the thickness of the block. By means of an electrically heated wire or the like, commonly used for cutting such foam, cuts 14, 15 and 16 then are made across the short dimension of the block to separate a core 17 from the block 10. Flaps 18 and 19 are then separated at the incision 13 and peeled away from the core 17 to permit its separation from the block 10.

Figure 2:
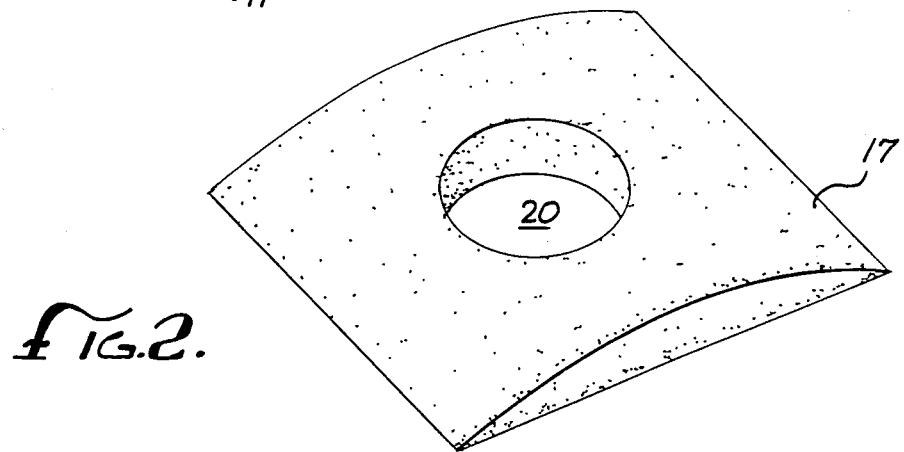
FIG. 2 is a view in perspective of the core of the pillow of FIG. 1.
Figure 3:
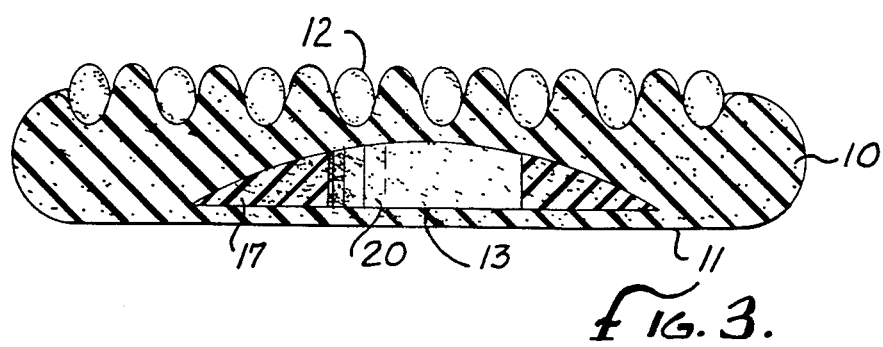
FIG. 3 is a view in section, taken on the line 3—3 of FIG. 1.
Figure 6:
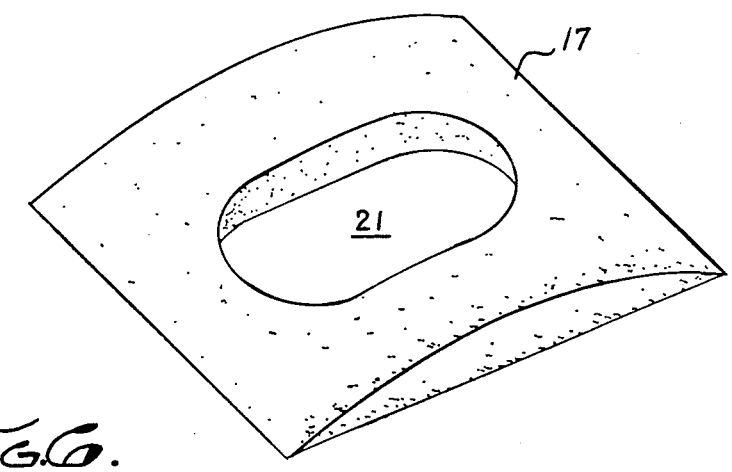
FIG. 6 is a view in perspective of a modified form of the core shown in FIG. 2.

A void 20, which ordinarily should be slightly smaller in diameter than a user's head, is then cut in the core 10. This may be circular in shape, as shown at 20 in FIG. 2, oval as shown at 21 in FIG. 6, or of any other shape dictated by a special purpose. A circular shape permits any desired orientation of the pillow with respect to the user, while another shape renders a specific orientation preferable. The core 17 then is returned to its original position in the block 10 and sealed in place by the application of adhesive to its surfaces and the contacting surfaces of block 10.

Figure 4:
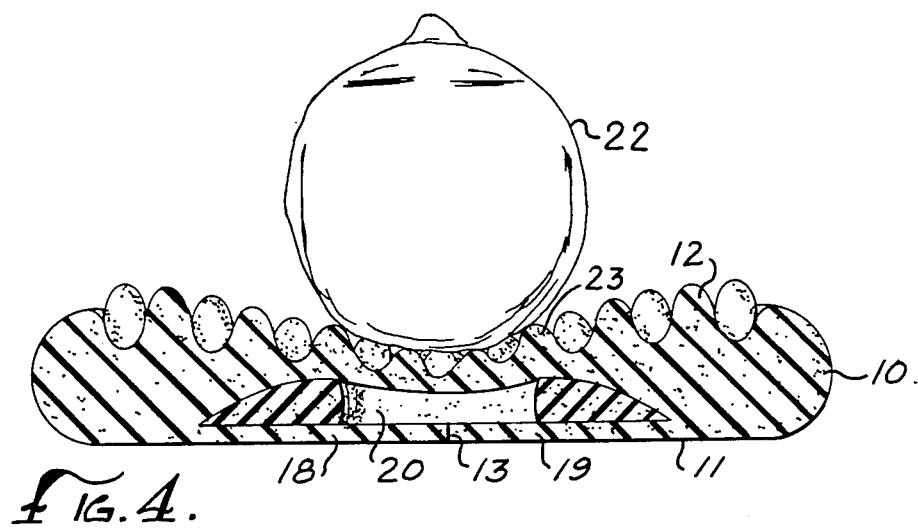
FIG. 4 is a view in section corresponding to FIG. 3 illustrating the deformation effected by a user's head.
Figure 5:
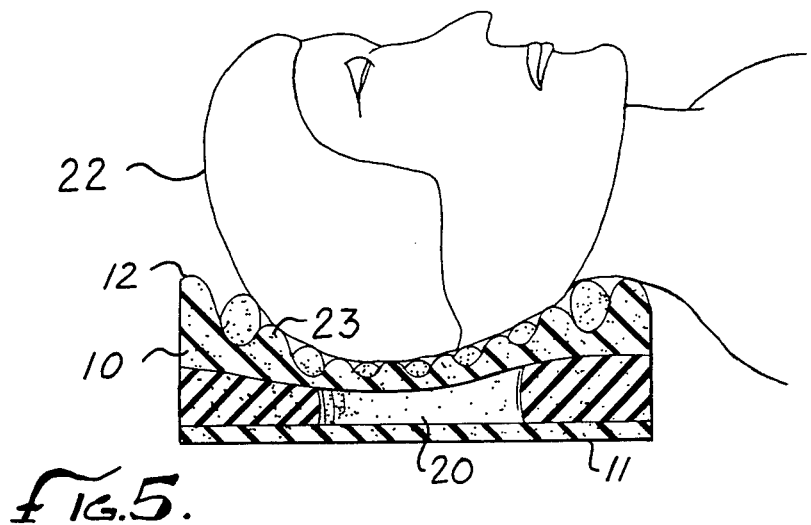
FIG. 5 is a fragmented view in section normal to the line of section of FIG. 4, illustrating the deformation effected by the user's head.

As shown in FIGS. 4 and 5, the head 22 of a user placed on the convoluted upper surface 12 over the void 20 produces the double effect of depressing a portion of the block 10 overlying the void 20 into the void and of tilting the protuberances 23 inwardly against the head, cradling the head in the less firm area.

The invention and its attendant advantages will be understood from the he foregoing description and it will be apparent that various changes may be made in the form, construction and arrangements of the parts without departing from the spirit and scope thereof or sacrificing its material advantages, the arrangements herein before described being merely by way of example. I do not wish to be restricted to the specific forms shown or uses mentioned, except as defined in the accompanying claims, wherein varius portions have been separated for clarity of reading and not for emphasis.

I claim:

1. A method of fabricating from a block of plastic foam, a pillow having areas of different compressibility over its surface including the steps of making a transverse incision across one surface of said block, making longitudinal cuts beginning at the bottom of said incision defining a core of said block, separating said core from said block, excising a portion of said core centrally thereof, and replacing said core in the position from which it was removed.

* * * * *